United States Patent
Shatani et al.

(10) Patent No.: US 12,512,540 B2
(45) Date of Patent: Dec. 30, 2025

(54) CYLINDRICAL SECONDARY CELL LID COMPRISING MULTIPLE RECESSED CONTACT PORTIONS

(71) Applicant: Northvolt AB, Stockholm (SE)

(72) Inventors: Kenya Shatani, Stockholm (SE); Michael Shaughnessy, Västerås (SE)

(73) Assignee: NORTHVOLT AB, Stockholm (SE)

( * ) Notice: Subject to any disclaimer, the term of this patent is extended or adjusted under 35 U.S.C. 154(b) by 0 days.

(21) Appl. No.: 18/321,482

(22) Filed: May 22, 2023

(65) Prior Publication Data

US 2024/0072344 A1 Feb. 29, 2024

(30) Foreign Application Priority Data

Aug. 31, 2022 (SE) .................... 2251006-9

(51) Int. Cl.
*H01M 50/152* (2021.01)
*H01M 50/107* (2021.01)
*H01M 50/538* (2021.01)

(52) U.S. Cl.
CPC ....... *H01M 50/152* (2021.01); *H01M 50/107* (2021.01); *H01M 50/538* (2021.01)

(58) Field of Classification Search
CPC . H01M 50/152; H01M 50/107; H01M 50/538
See application file for complete search history.

(56) References Cited

U.S. PATENT DOCUMENTS

| 7,700,231 | B2 | 4/2010 | Kimura et al. | |
|---|---|---|---|---|
| 2021/0218095 | A1* | 7/2021 | Narbonne | H01M 50/167 |
| 2021/0376392 | A1* | 12/2021 | Park | H01M 4/13 |
| 2022/0102789 | A1 | 3/2022 | Shimizu et al. | |
| 2022/0407192 | A1* | 12/2022 | Li | H01M 50/536 |

FOREIGN PATENT DOCUMENTS

| CN | 114824674 A | 7/2022 |
|---|---|---|
| JP | 2000-260418 A | 9/2000 |
| JP | 2005-340156 A | 12/2005 |

OTHER PUBLICATIONS

Final Notice for Swedish Patent Application No. 2251006-9, dated Apr. 5, 2023, (24 pages), Swedish Patent and Registration Office, Stockholm, Sweden.

International Search Report and Written Opinion for International Application No. PCT/EP2023/073526, dated Dec. 4, 2023, (13 pages), European Patent Office, Rijswijk, Netherlands.

\* cited by examiner

*Primary Examiner* — Jimmy Vo
(74) *Attorney, Agent, or Firm* — Alston & Bird LLP

(57) ABSTRACT

This disclosure presents a cylindrical secondary cell lid (1) for a cylindrical secondary cell (10), the cylindrical secondary cell lid (1) comprising a number of recessed contact portions (2) to be arranged in direct electrical contact with an electrode roll (20) arranged inside the cylindrical secondary cell (10), the area of the recessed contact portions (2) being 50 to 80 percent of the total area of the cylindrical secondary cell lid (1).

20 Claims, 2 Drawing Sheets

CYLINDRICAL SECONDARY CELL LID COMPRISING MULTIPLE RECESSED CONTACT PORTIONS

CROSS REFERENCE TO RELATED APPLICATIONS

This application claims priority to and the benefit of Swedish Application No. 2251006-9, filed Aug. 31, 2022; the contents of which as are hereby incorporated by reference in its entirety.

TECHNICAL FIELD

The present disclosure generally pertains to cylindrical secondary cells and more precisely to a lid for such a cell, where the lid comprises multiple recessed contact portions.

BACKGROUND

In addressing climate change, there is an increasing demand for rechargeable batteries, e.g. to enable electrification of transportation and to supplement renewable energy. Currently, lithium-ion batteries are becoming increasingly popular. They represent a type of rechargeable battery in which lithium ions move from the negative electrode to the positive electrode during discharge and back when charging.

As the demand for rechargeable batteries increases, more and more focus is being placed on production speed and cost. To achieve an effective production of rechargeable batteries, the design of the batteries as well as their manufacturing process can be optimized.

Another aspect to consider is that the rechargeable batteries must be safe to use. Therefore, rechargeable batteries have at least one vent for releasing gas when the pressure inside the batteries rises above an allowed level.

A rechargeable battery, often referred to as a secondary battery, typically comprises one or more secondary cells electrically connected to each other.

SUMMARY

It is in view of the above considerations and others that the embodiments of the present invention have been made. The present disclosure aims at providing highly reliable secondary cells that are efficient in manufacture. The number of components is to be reduced and the assembly thereof is to be simplified.

According to one aspect of the present disclosure, a cylindrical secondary cell lid is provided. The cylindrical secondary cell lid comprises a number of recessed contact portions to be arranged in direct electrical contact with an electrode roll arranged inside the cylindrical secondary cell. The area of the recessed contact portions is 50 to 80 percent of the total area of the cylindrical secondary cell lid.

According to another aspect, the present disclosure provides a cylindrical secondary cell comprising an electrode roll arranged therein, and a cylindrical secondary cell lid. The cylindrical secondary cell lid comprises a number of recessed contact portions to be arranged in direct electrical contact with the electrode roll. The area of the recessed contact portions is 50 to 80 percent of the total area of the cylindrical secondary cell lid.

According to a further aspect, the present disclosure provides a cylindrical secondary cell comprising an end comprising a number of recessed contact portions to be arranged in direct electrical contact with an electrode roll arranged inside the cylindrical secondary cell. The area of the recessed contact portions is 50 to 80 percent of the total area of the cylindrical secondary cell end.

The recessed contact portions may be generally trapezoid in shape, or may have the shape of a truncated annulus. The cylindrical secondary cell may comprise both a positive terminal and a negative terminal at one and the same end. The cylindrical secondary cell lid may be arranged in direct electrical contact with an enclosure of the cylindrical secondary cell.

According to a further aspect of the present disclosure, a cylindrical secondary cell lid is provided. The cylindrical secondary cell lid comprises a number of recessed contact portions to be arranged in direct electrical contact with an electrode roll arranged inside the cylindrical secondary cell. The cylindrical secondary cell lid further comprises a flange that may be configured to be arranged in direct electrical contact with a cylindrical enclosure of the cylindrical secondary cell. The extension (height) of the recessed contact portions in a longitudinal direction of the cylindrical secondary cell may be essentially equal to the extension (height) of the flange in a longitudinal direction of the cylindrical secondary cell. The area of the recessed contact portions may be 50 to 80 percent of the total area of the cylindrical secondary cell lid.

The height of the recessed contact portions may exceed the height of the flange by 10 to 50 percent, such as 20 to 40 percent.

The height of the flange may exceed the height of the recessed contact portions by 10 to 50 percent, such as 20 to 40 percent.

The recessed contact portions and the flange may protrude in axially opposite directions.

Alternatively, the recessed contact portions and the flange may protrude in the same direction.

Advantages associated with the present disclosure, and additional conceivable features, will become clear from the following description of embodiments and examples.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings, in which.

DETAILED DESCRIPTION

Embodiments of the present disclosure will now be described more fully hereinafter. The invention may, however, be embodied in many different forms and should not be construed as limited to the embodiments set forth herein; rather, these embodiments are provided by way of example so that this disclosure will be thorough and complete, and will fully convey the scope of the invention to those persons skilled in the art.

Figure 3:
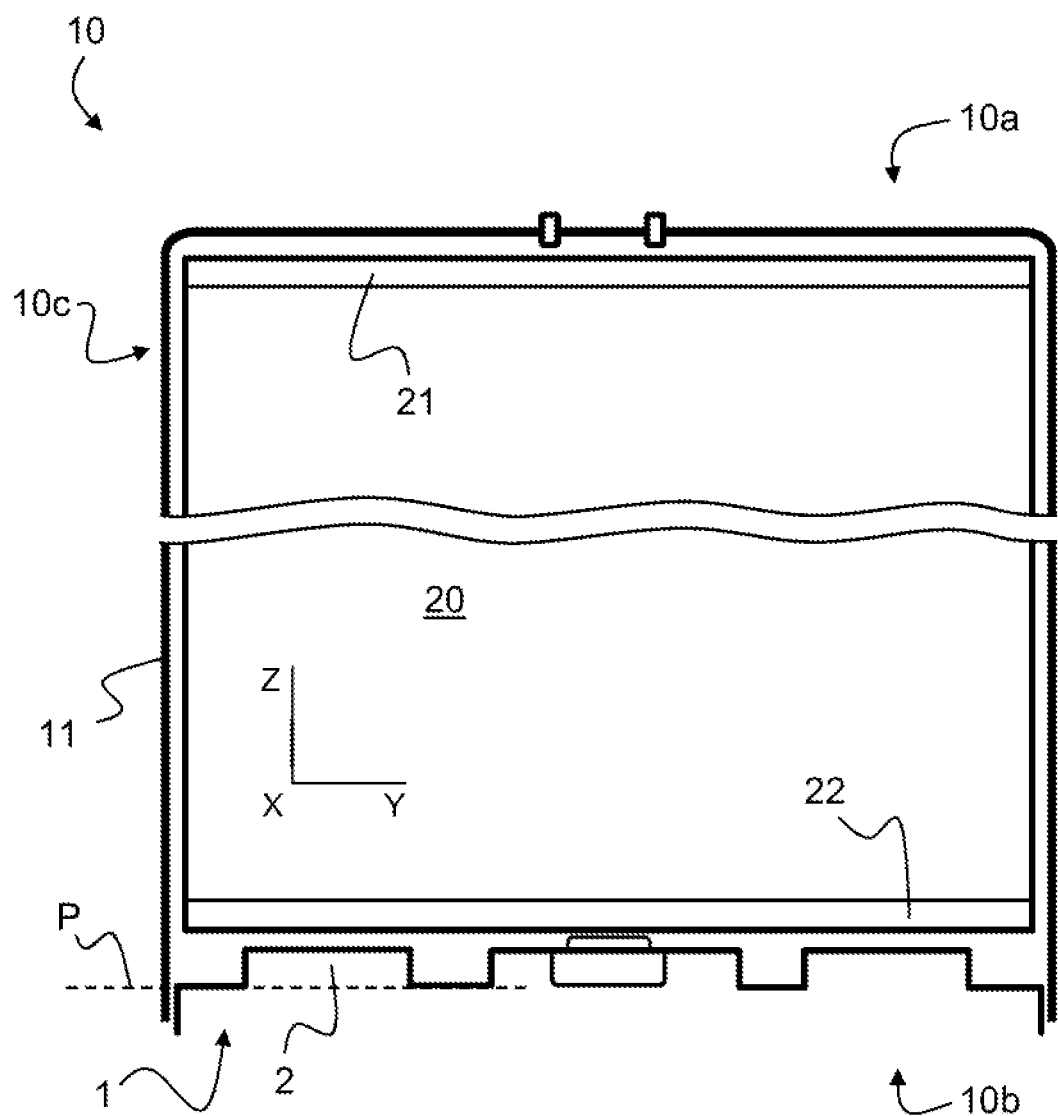
FIG. 3 illustrates a cylindrical secondary cell and the lid of FIGS. 1 and 2.

FIG. 3 shows a cylindrical secondary cell 10 (hereinafter referred to as cell) in a cross-sectional side view. In the exemplified embodiment, the cell 10 is circular cylindrical. The cell 10 comprises a cylindrical enclosure 11 having a first enclosure end 10a, an opposite second enclosure end 10b and an enclosure sidewall 10c that extends between the enclosure ends 10a, 10b.

In the exemplified embodiment, the first and second enclosure ends 10a, 10b are circular. The enclosure sidewall 10c is circular cylindrical. The cell 10, and thus its enclosure sidewall 10c, may be elongate and extend along a longitudinal axis (Z-axis in FIG. 3). The enclosure ends 10a, 10b may extend in planes (XY-planes in FIG. 3) that are perpendicular to the longitudinal axis.

As is illustrated, the first enclosure end 10a, or first enclosure end side (top side in FIG. 3), may be formed in one piece with the enclosure sidewall 10c. The second enclosure end 10b may be open, a separate lid 1 may, as shown, be attached to the cylindrical enclosure at the open enclosure end 10b. Thus, the lid 1 may form the second enclosure end side (bottom side in FIG. 3). Alternatively, both ends sides may be formed by respective lids.

The cell 10 of FIG. 3 is of a type that has both a positive terminal and a negative terminal at one and the same end 10a (the top end in FIG. 3) of the cylindrical secondary cell 10. The first enclosure end 10a comprises a central terminal through-hole for the positive terminal. The negative terminal is electrically connected to the cylindrical enclosure 11. More precisely, the negative terminal is formed by the top surface at the first enclosure end 10a that surrounds the terminal through-hole. The entire cylindrical enclosure 11 (apart from the positive terminal at the top end) may be the negative terminal.

A cell 10 having both terminals at one end may bring advantages as regards electrically connecting the cell to a load. Conductors electrically connecting the terminals to the load may be positioned on the same end, the terminal end (top end in FIG. 3) 10a, of the cell. The opposite end, which may be referred to as the electrolyte-filling end (bottom end in FIG. 3) 10b, of the cell 10 may be dedicated to electrolyte filling and venting. An overpressure may be generated within the cell during operation, in particular upon malfunction of the cell or of the load connected to the cell. Such malfunction may require a release of gas and/or other ejecta out of the cell, and it may be advantageous to direct the released gas and/or other ejecta away from the conductors, i.e. out from the end that is opposite to the terminal end.

A number of cells 10 may be positioned at a low position in an electric vehicle. The cells 10 may be arranged with the terminal ends 10a directed upwards and the electrolyte-filling ends 10b (bottom end in FIG. 3) directed downwards. Upon malfunction, for example resulting from a faulty electric vehicle charger or a faulty cell 10, a release of gas and/or other ejecta from the electrolyte-filling end(s) will be advantageously directed downwards towards the ground beneath the vehicle. In other applications than vehicles, the electrolyte-filling ends may be directed towards a desired location such that any gas and/or other ejecta will not cause damages or injuries.

As is illustrated in FIG. 3, the cell 10 may comprise an electrode roll 20. The electrode roll 20 comprises a first and a second conductive sheet 21, 22 and separating means (not shown).

The separating means may also be termed separator. The conductive sheets 21, 22 and the separating means are rolled to form a circular cylindrical roll. The conductive sheets 21, 22 are coated with electrode coatings and on assembly of the cell 10, the cylindrical enclosure 11 is filled with an electrolyte. The coatings on the conductive sheets 21, 22 act as cathode and anode, respectively. The cathode, anode and electrolyte provide electrochemical energy storage. This principle is known per se, and the electrode roll 20 is commonly referred to as a jellyroll.

The conductive sheets 21, 22 of the electrode roll 20 may be axially offset in relation to one another, and each conductive sheet may comprise an end section that is not coated with electrode coating. Via the non-coated end sections, the respective ends of the electrode roll may be efficiently electrically connected to a respective assigned terminal of the cell 10. This design is known per se and commonly referred to as a tabless cell.

As is understood from FIG. 3, one 22 of the conductive sheets may be in electrical contact, more precisely in direct electrical contact, with the lid 1. Direct electrical contact may be referred to as physical contact.

Figure 1:
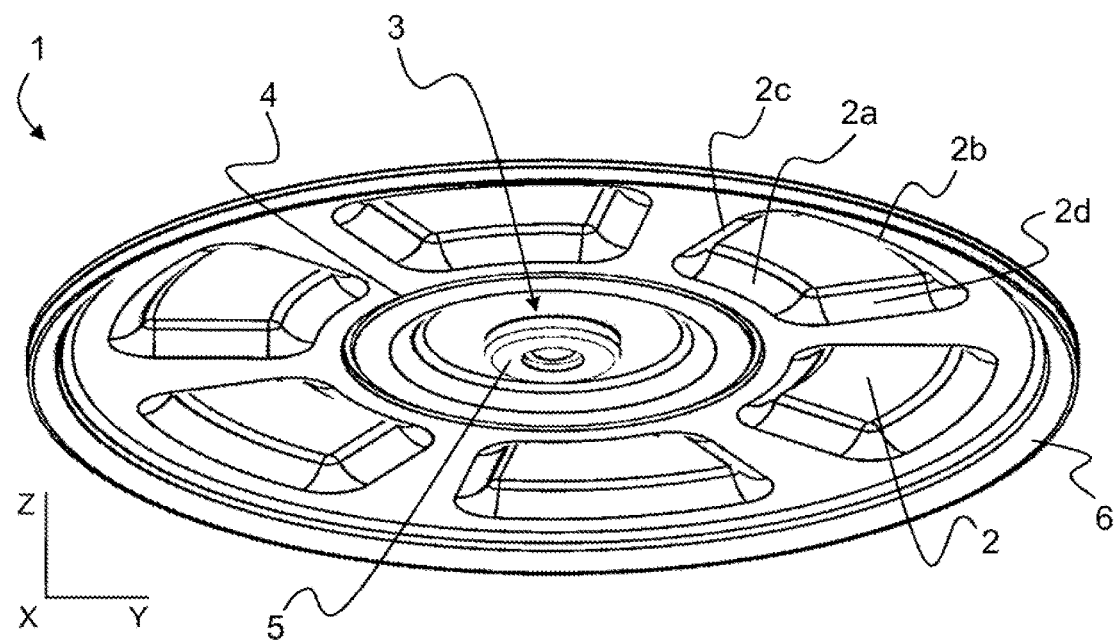
FIG. 1 shows a cylindrical secondary cell lid in isometric view, FIG. 2 schematically illustrates the lid of FIG. 1 in axial cross-section.
Figure 2:
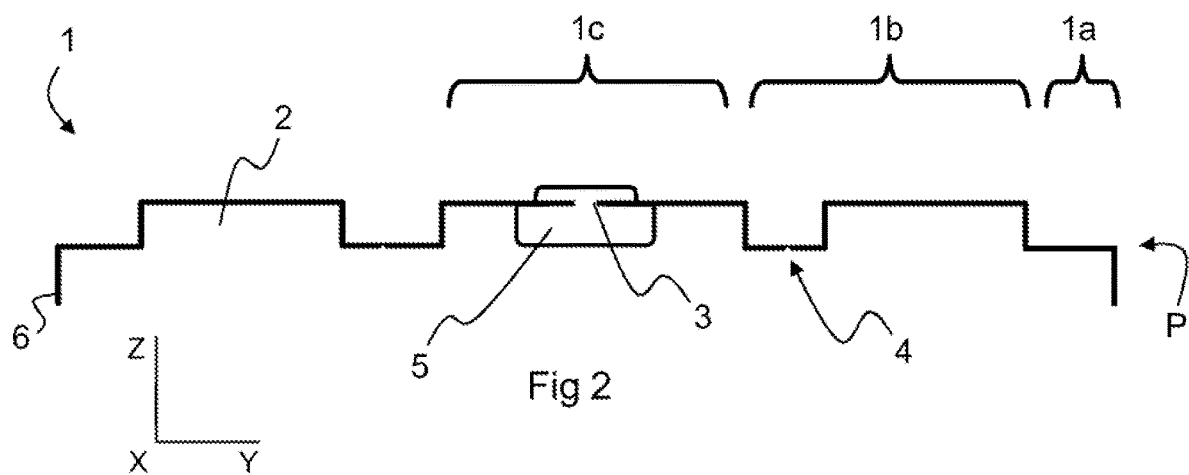
Figure 4:
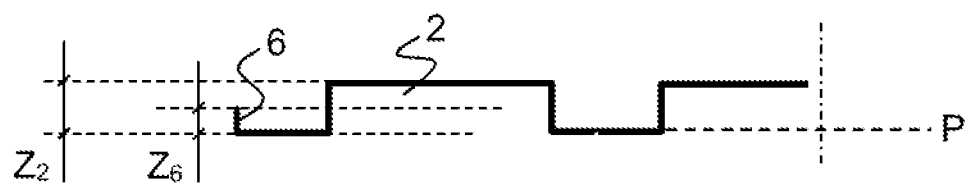
FIG. 4 illustrates an alternative embodiment to the one illustrated in FIG. 2 (alternative flange).

Turning to FIGS. 1, 2 and 4, the present lid 1 is configured to be arranged in direct electrical contact with the conductive sheet 22. Typically, the lid 1 is welded, e.g. laser welded, to the conductive sheet 22. Thus, no additional separate component needs to be arranged to make contact with the conductive sheet 22. The lid 1 described herein may be attached to other cell enclosures than the one of FIG. 3.

As is shown in the figures, the lid 1 has a number of recessed contact portions 2 that are configured to form the direct electrical contact with the conductive sheet 22. The recessed contact portions 2 are integral portions of the lid 1. The above-mentioned weld may advantageously be arranged within the recessed contact portions 2.

Each individual recessed contact portion 2 should preferably have a relatively large area to provide a good electrical contact with the conductive sheet 22. A large area is also beneficial as it simplifies positioning the weld, e.g. laser weld lines, within the recessed contact portion 2. A large area further provides good mechanical support to the conductive sheet 22 and the entire electrode roll 20.

For example, each recessed contact portion 2 may have an area of 5 to 15 percent, or 7 to 11 percent, of the total area of the cylindrical secondary cell lid 1. With such area ranges, there may be six recessed contact portions 2. In this disclosure, the area of the recessed contact portion 2 is the area that is in direct electrical contact with the conductive foil 22 of the electrode roll.

In another example, each recessed contact portion may have an area of 10 to 30 percent, or 15 to 30 percent, of the total area of the cylindrical secondary cell lid 1. With such area ranges, there may be three recessed contact portions 2.

Preferably, the total area of the recessed contact portions 2 is 50 to 80 percent of the total area of the cylindrical secondary cell lid 1. Other numbers of recessed contact portions are conceivable, such as four. The total area of the contact portions 2 is to be distributed over the recessed contact portions.

The recessed contact portions 2 may be, as is shown, equidistantly distributed along the circumference of the lid 1. Such a pattern may be beneficial in assembly of the cell and for positioning the welds.

Each one of the recessed contact portions 2 may be of the same size, as is shown herein. Further, the recessed contact portions 2 may each have essentially the same extension (dimension or length) radially and circumferentially to facilitate welding. In other words, the respective contact portion 2 may have similar extensions in all direction as seen in the plane (XY-plane) of the lid.

The smallest extension of the respective recessed contact portion 2 may be at least 20 percent of the total extension of the lid 1. A recessed contact portion 2 should preferably have a relatively large radial extension in order to provide good electrical contact with the conductive sheet 22 that, as has been mentioned, is in the form of a roll. Thereby, the internal resistance of the cell 1 may be kept low.

In other embodiments (not shown), not all recessed contact portions are of the same size. For example, there may be larger recessed contact portions that are welded to the conductive sheet, and smaller recessed contact portions that are not welded to the conductive sheet. The smaller recessed contact portions may support the conductive sheet, but not be attached to the conductive sheet. An irregular (sizes or positioning) pattern of recessed contact portions may be beneficial in manufacture, as such a pattern may facilitate vision systems identifying the orientation of the lid. The vision systems may be used for controlling welding apparatuses to arrange the welds at desired locations.

Referring to FIG. 1, the respective recessed contact portion 2 may generally be rectangular or generally square. More precisely, the recessed contact portion 2 may be generally trapezoid in shape. Even more precisely, the recessed contact portion 2 may, as in the disclosed example, comprise first and second circumferential sides 2a, 2b and first and second radial sides 2c, 2d.

FIG. 1 represents one possible realization of the lid 1 and may thus not be seen as merely a schematic representation of the lid 1. At least as regards the shape of the recessed contact portions 2. It is to be apprehended that if fewer recessed contact portions 2 are realized, then the circumferential extension of each recessed contact portion 2 should be increased to provide a total recessed contact portion area that corresponds to the one of FIG. 1.

The first circumferential side 2a of the respective recessed contact portion 2 may extend concentrically with the lid 1. Thus, the first circumferential side 2a may be curved, more precisely arcuate or circular arcuate. The first circumferential side 2a may be positioned essentially mid-way between the outer radial end (or circumferential edge) of the lid 1 and the center of the lid. In the present example, the first circumferential side 2a extends approximately 40 to 60 degrees around the 360 degrees circumference of the lid.

The second circumferential side 2b of the respective recessed contact portion 2 may extend concentrically with the lid 1 and thus with the first circumferential side 2a. The second circumferential side 2b may be curved, more precisely arcuate or circular arcuate. The second circumferential side 2b may be positioned close to the outer radial end (or circumferential edge) of the lid 1. The distance between the second circumferential side 2b and the outer radial end may correspond to 5 to 20 percent of the radius of the lid 1, preferable approximately 15 percent. In the present example, the second circumferential side 2b extends approximately 40 to 60 degrees around the 360 degrees circumference of the lid.

As is illustrated, the recessed contact portions 2 may be positioned closer to the outer radial end of the lid 1 than to the center of the lid 1.

The first radial side 2c of the respective recessed contact portion 2 extends from a first end of the first circumferential side 2a to a first end of the second circumferential side 2b. The first radial side 2c may be straight. In the present example, the first radial side extends approximately 25 to 40 percent of the radius of the lid 1. The first radial side 2c may be aligned with the radial direction of the lid 1.

The second radial side 2d of the respective recessed contact portion 2 extends from a second end of the first circumferential side 2a to a second end of the second circumferential side 2b. The second radial side 2d may be straight. In the present example, the second radial side extends approximately 25 to 40 percent of the radius if the lid 1. The second radial side 2d may be aligned with the radial direction of the lid 1.

The sides 2a, 2b, 2c, 2d and corners where they meet may be rounded (radially and axially), as is shown. Thus, the transition between the recessed contact portion 2 and the surrounding area of the lid 1 may be rounded or smooth. This design may be beneficial for manufacturing purposes and for reducing mechanical and electrical stress concentrations. The area, more precisely the contact area, of a recessed contact portion 2 is measured on the surface of the recessed contact portion 2 that faces the conductive sheet 22. Thus on the top surface in FIG. 1.

The respective, individual, recessed contact portion 2 may be defined by the above described sides 2a, 2b, 2c, 2d. The shape of the respective recessed contact portion 2 disclosed herein may be referred to as a truncated annulus.

Referring to FIGS. 1 and 2, the lid 1 may be said to comprise three separate regions 1a, 1b, 1c. These regions are in the present embodiment radially separated and thus do not overlap.

The regions 1a, 1b, 1c are formed in one piece. The regions 1a, 1b, 1c are all made in one piece and together form the lid 1. The lid 1 may for example be formed by pressing a circular piece of sheet metal.

There may be a radially outer region 1a, or outer region, that forms the radially outermost section of the lid 1. The outer region 1 may encircle a radially intermediate region 1b, or intermediate region that forms an intermediate region of the lid 1. The intermediate region 1b may in turn encircle a radially inner region 1c, or inner region, that forms an inner region of the lid 1. In the present example, the outer, intermediate and inner regions 1a, 1b, 1c are concentric. Further, the outer region 1a is annular. The intermediate region 1b. The inner region 1c is circular. Bearing in mind that there may be a fill opening 3 arranged within the inner region 1c is, the inner region 1c may also be annular.

The outer region 1a may, as is clear from FIG. 3, be configured to be attached to the cylindrical enclosure 11. The outer region 1a may be configured to be arranged in direct electrical contact with the cylindrical enclosure 11, e.g. by welding. For this reason, the outer region 1a may comprise a flange 6 (as is illustrated). However, as is known to persons skilled in the art, there are other methods for attaching a lid to a cylindrical enclosure of a cell.

The intermediate region 1b may comprise the above-described recessed contact portions 2.

The lid 1 may, as is illustrated, comprise a groove or notch 4 for providing an opening in the lid 1 if a pressure to which the lid is subjected reaches a threshold value. In other words, the groove or notch 4 is to provide an opening in the lid 1 when the lid 1 is attached to the cylindrical enclosure 11, if the pressure inside the cylindrical enclosure reaches a threshold value. In such a situation, gas and/or other ejecta may be released out of the cell 10 through the opening formed in the lid 1. The opening formed in the lid 1 as a result of the groove or notch 4 breaking may be referred to as a vent opening.

The groove or notch 4, which may be referred to as a breakable portion, may be thinning of the lid material that is configured to break before other parts of the lid 1 (and the cylindrical enclosure). The notch 4 may be circular and may at least partly encircle a central portion of the lid 1.

The notch 4 may be comprised in the intermediate region 1b. The notch 4 is in the present embodiment positioned radially inwards the recessed contact portions 2.

The inner region 1c may comprise a fill opening 3 providing for the above-described electrolyte filling. The inner region 1c may be recessed, as is illustrated. The recessed inner region 1c may extend in the same plane as the recessed contact portions 2. The filling opening 3 may, as is shown, be sealed by a sealing element 5 such as for example a rivet, such as a blind rivet. If the inner region 1c is recessed, the sealing element 5 may be countersunk such that it does not protrude axially beyond the enclosure end 10b to which the lid 1 is attached. The sealing element 5 may be countersunk by the recessed inner region 1c such that it does not protrude from the area of the lid that surrounds the inner region 1c, or protrudes (axially) from the circumferential edge of the lid 1 (which may be formed by the flange 6). The electrode roll 20 may comprise a central electrolyte channel or void (not shown) into which the sealing element 5 may protrude.

The lid 1 may be generally disc-shaped. The lid 1 may have the general shape of a circular plate. In some more detail, the lid 1 may comprise a circular disc that at the radially outer end comprises the above-described flange. The flange 6 may extend from the circular disc in a direction away from the cylindrical enclosure 10 (when the lid 1 is attached to the cylindrical enclosure 10), see FIGS. 1 to 3. The flange 6 may however alternatively extend in a direction towards the cylindrical enclosure 10, see FIG. 4. The circular disc and the flange may be formed in one integral piece.

FIG. 3 illustrates a certain gap between the cylindrical enclosure 11 and the lid 1. It is to be apprehended that in actual implementations the lid 1 is in direct contact with the cylindrical enclosure 11 and may be attached thereto for example by welding. Also, there is a gap illustrated between the recessed contact portions 2 and the conductive sheet 22. In an actual implementation, the recessed contact portions 2 are brought into contact with, and possibly clamped against, the conductive sheet 22 before, optionally, being attached thereto by welding.

The recessed contact portions 2 are recessed in relation to a base plane P of the lid 1. The base plane is indicated in FIGS. 2 to 4, and may be described as the plane from which the recessed contact portions 2, the flange 6, and the inner region 1c protrude. Each individual recessed contact portion 2 may, as is shown, protrude separately. The recessed contact portions 2 are recessed in the (axial, Z-axis) direction that faces the electrode roll 20, towards the electrode roll. Also, the inner region 1c may be recessed in the direction that faces the electrode roll 20, towards the electro roll (se e.g. FIGS. 1 to 3).

The axial extension, or protrusion or height, of the recessed contact portions 2 may correspond to the recessed height of the inner region 1c. The inner region 1c may mechanically support the electrode roll 20. The height of the recessed contact portions 2 may correspond to the height of the flange 6.

The recessed contact portions 2 may have essentially the same height as the flange 6, as is shown in FIGS. 2 and 3. In some embodiments, the recessed contact portions 2 may have a height that exceeds the height of the flange 6, the recessed contact portions 2 may for example be two or three times the height of the flange 6. In some embodiments, the flange 6 may have a height that correspondingly exceeds the height of the recessed contact portions 2.

The recessed contact portions 2 may have the same height as the recessed inner region 1c. In some embodiments, the recessed contact portions 2 may have a height that exceeds the height of the recessed inner region 1c. In some embodiments, the recessed inner region 1c may have a height that exceeds the height of the recessed contact portions 2.

The embodiment of FIG. 4 is similar to the one of FIGS. 1 to 3, but differs in that the recessed contact portions 2 and the flange 6 protrude in the same direction (towards the cylindrical enclosure 10, i.e. towards the electrode roll 20). Further, the axial extension $Z_2$ of the recessed contact portions 2 exceeds the axial extension $Z_6$ of the flange 6.

In the embodiment of FIG. 4, the axial extension $Z_2$ of the recessed contact portions 2 is approximately two times the axial extension $Z_6$ of the flange 6. In another embodiment (not shown), the axial extension $Z_2$ of the recessed contact portions 2 is approximately three times the axial extension $Z_6$ of the flange 6. With such a design ($Z_2 > Z_6$), the risk of electrical contact between the electrode roll 20 and the flange 6 may be decreased.

Modifications and other variants of the described embodiments will come to mind to ones skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. For example, a cylindrical secondary cell lid, or a cylindrical secondary cell end, may be provided with the recessed contact portions described herein without the lid or end comprising the other features of the lid described herein. Such as the regions, the notch or the fill opening.

Furthermore, although specific terms may be employed herein, they are used in a generic and descriptive sense only and not for purposes of limitation. Therefore, persons skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different claims (or embodiments), these may possibly advantageously be combined, and the inclusion of different claims (or embodiments) does not imply that a certain combination of features is not feasible and/or advantageous. In addition, singular references do not exclude a plurality. Finally, reference numerals in the claims are provided merely as a clarifying example and should not be construed as limiting the scope of the claims in any way.

The invention claimed is:

1. A cylindrical secondary cell lid (1) for a cylindrical secondary cell (10) containing an electrode roll (20) positioned therein, the cylindrical secondary cell lid (1) comprising a number of recessed contact portions (2) configured to be arranged in direct electrical contact with the electrode roll (20) and welded to the electrode roll (20), an area of the recessed contact portions (2) being 50 to 80 percent of a total area of the cylindrical secondary cell lid (1), the number of recessed contact portions (2) consisting of three to four recessed contact portions (2) each being positioned and aligned relative to one another at a single radial position other than a center of the cylindrical secondary cell lid (1), an area other than that of the recessed contact portions (2) being spaced apart from and configured to not be in direct electrical contact with the electrode roll (20).

2. The cylindrical secondary cell lid (1) of claim 1, wherein the area of each of the two to six recessed contact portions (2) is 5 to 15 percent of the total area of the cylindrical secondary cell lid (1).

3. The cylindrical secondary cell lid (1) of claim 1, wherein the area of each of the two to six recessed contact portions (2) is 7 to 11 percent of the total area of the cylindrical secondary cell lid (1).

4. The cylindrical secondary cell lid (1) of claim 2, wherein the two to six recessed contact portions (2) are six recessed contact portions (2).

5. The cylindrical secondary cell lid (1) of claim 1, wherein the area of each of the two to six recessed contact portions (2) is 10 to 30 percent of the total area of the cylindrical secondary cell lid (1).

6. The cylindrical secondary cell lid (1) of claim 1, wherein the area of each of the two to six recessed contact portions (2) is 15 to 20 percent of the total area of the cylindrical secondary cell lid (1).

7. The cylindrical secondary cell lid (1) of claim 5, wherein the two to six recessed contact portions (2) are three recessed contact portions (2).

8. The cylindrical secondary cell lid (1) of claim 1, wherein the lid has an outer region (1a), an inner region (1c), and an intermediate region (1b), the intermediate region (1b) containing the two to six recessed contact portions (2).

9. The cylindrical secondary cell lid (1) of claim 8, wherein the outer region (1a) is configured to be attached to a cylindrical enclosure (11) of the cylindrical secondary cell (10).

10. The cylindrical secondary cell lid (1) of claim 8, wherein the inner region (1c) is recessed in relation to the intermediate region (1b).

11. The cylindrical secondary cell lid (1) of claim 8, wherein the inner region (1c) comprises a fill opening (3).

12. The cylindrical secondary cell lid (1) of claim 1, further comprising a groove or notch (4) configured to provide an opening in the cylindrical secondary cell lid (1) if a pressure to which the lid (1) is subjected reaches a threshold value.

13. The cylindrical secondary cell lid (1) of claim 12, wherein the groove or notch (4) is provided in an intermediate region (1b).

14. The cylindrical secondary cell lid (1) of claim 1, wherein an outer region (1a), an intermediate region (1b) and an inner region (1c) do not overlap.

15. The cylindrical secondary cell lid (1) of claim 1, further comprising a flange (6) to be arranged in direct physical contact with a cylindrical enclosure (11) of the cylindrical secondary cell (10), wherein an extension ($Z_2$) of the recessed contact portions (2) in a longitudinal direction (Z) of the cylindrical secondary cell (10) essentially equals an extension ($Z_6$) of the flange (6) in the longitudinal direction (Z) of the cylindrical secondary cell (10).

16. The cylindrical secondary cell lid (1) of claim 15, wherein the recessed contact portions (2) and the flange (6) extend in the same axial direction.

17. The cylindrical secondary cell lid (1) of claim 16, wherein the extension ($Z_2$) of the recessed contact portions (2) in the longitudinal direction (Z) of the cylindrical secondary cell (10) exceeds the extension ($Z_6$) of the flange (6) in the longitudinal direction (Z) of the cylindrical secondary cell (10).

18. A cylindrical secondary cell (10) comprising an end (10b) comprising a number of recessed contact portions (2) arranged in direct electrical contact with an electrode roll (20) positioned inside the cylindrical secondary cell (10) and welded to the electrode roll (20), an area of the recessed contact portions (2) being 50 to 80 percent of a total area of a cylindrical secondary cell lid (1) of the cylindrical secondary cell (10), the number of recessed contact portions (2) consisting of three to four recessed contact portions (2) each being positioned and aligned relative to one another at a single radial position other than a center of the cylindrical secondary cell lid (1), an area other than that of the recessed contact portions (2) being spaced apart from and not in direct electrical contact with the electrode roll (20).

19. The cylindrical secondary cell (10) of claim 18, wherein the two to six recessed contact portions (2) are evenly spaced at the single radial position around a circumference of the cylindrical secondary cell end (10b).

20. A cylindrical secondary cell (10) comprising:
a cylindrical secondary cell lid (1); and
an electrode roll (20) positioned within the cylindrical secondary cell (10),
wherein:
the cylindrical secondary cell lid (1) comprises of a number of recessed contact portions (2) and a number of non-recessed contact portions,
the number of recessed contact portions are arranged in direct physical contact with the electrode roll (20), an area of the recessed contact portions (2) being 50 to 80 percent of a total area of the cylindrical secondary cell lid (1),
the number of recessed contact portions (2) consisting of three to four recessed contact portions (2) each being positioned and aligned relative to one another at a single radial position other than a center of the cylindrical secondary cell lid (1), and
the number of non-recessed contact portions define an area other than that of the recessed contact portions, wherein the entire area of each non-recessed contact portions is spaced apart from and configured to not be in direct physical contact with the electrode roll (20).

* * * * *